(12) United States Patent
Lee et al.

(10) Patent No.: US 7,287,959 B2
(45) Date of Patent: Oct. 30, 2007

(54) BLUNT TIP TURBINE BLADE

(75) Inventors: Ching-Pang Lee, Cincinnati, OH (US); Aspi Rustom Wadia, Loveland, OH (US); John Christopher Brauer, Lawrenceburg, IN (US)

(73) Assignee: General Electric Company, Schenectady, NY (US)

( * ) Notice: Subject to any disclaimer, the term of this patent is extended or adjusted under 35 U.S.C. 154(b) by 134 days.

(21) Appl. No.: 11/294,210

(22) Filed: Dec. 5, 2005

(65) Prior Publication Data

US 2007/0128033 A1 Jun. 7, 2007

(51) Int. Cl.
*F01D 5/18* (2006.01)
*F01D 5/20* (2006.01)

(52) U.S. Cl. ................... 416/97 R; 416/96 R
(58) Field of Classification Search ............. 415/115, 415/116; 416/97 R, 96 R, 90 R, 92
See application file for complete search history.

(56) References Cited

U.S. PATENT DOCUMENTS

| | | | |
|---|---|---|---|
| 4,142,824 A | 3/1979 | Andersen | |
| 4,197,443 A | 4/1980 | Sidenstick | |
| 4,684,323 A | 8/1987 | Field | |
| 4,762,464 A | 8/1988 | Vertz et al. | |
| 4,893,987 A | 1/1990 | Lee et al. | |
| 4,992,025 A | 2/1991 | Stroud et al. | |
| 5,261,789 A | 11/1993 | Butts et al. | |
| 5,282,721 A | 2/1994 | Kildea | |
| 5,476,364 A | 12/1995 | Kildea | |
| 5,564,902 A | 10/1996 | Tomita | |
| 5,660,523 A | 8/1997 | Lee | |
| 5,720,431 A | 2/1998 | Sellers et al. | |
| 6,059,530 A | 5/2000 | Lee | |
| 6,086,328 A | 7/2000 | Lee | |
| 6,164,914 A | 12/2000 | Correia et al. | |
| 6,224,336 B1 | 5/2001 | Kercher | |
| 6,527,514 B2 | 3/2003 | Roeloffs | |
| 6,554,575 B2 | 4/2003 | Leeke et al. | |
| 6,595,749 B2 | 7/2003 | Lee et al. | |
| 6,672,829 B1 | 1/2004 | Cherry et al. | |
| 6,790,005 B2 | 9/2004 | Lee et al. | |
| 2004/0179940 A1* | 9/2004 | Liang | 416/97 R |

OTHER PUBLICATIONS

U.S. Appl. No. 10/937,642; filed Sep. 9, 2004; Lee et al.

* cited by examiner

*Primary Examiner*—Edward K. Look
*Assistant Examiner*—Dwayne J White
(74) *Attorney, Agent, or Firm*—William S. Andes; Francis L. Conte

(57) ABSTRACT

A turbine airfoil includes opposite pressure and suction sidewalls, and extends in chord between opposite leading and trailing edges and in span from a root to an outer tip cap. The tip cap bridges the sidewalls, and a flute extends chordally along the pressure sidewall and below the tip cap.

25 Claims, 3 Drawing Sheets

BLUNT TIP TURBINE BLADE

BACKGROUND OF THE INVENTION

The present invention relates generally to gas turbine engines, and, more specifically, to turbine blade cooling.

In a gas turbine engine air is pressurized in a compressor and mixed with fuel in a combustor for generating hot combustion gases. Energy is extracted from the gases in several turbine stages which power the compressor and produce useful work such as powering an upstream fan in a turbofan aircraft engine application.

Each turbine stage includes a stationary turbine nozzle which directs the combustion gases through a corresponding row of turbine rotor blades extending radially outwardly from a supporting rotor disk.

The stator vanes and rotor blades include hollow airfoils with internal cooling circuits therein which use air bled from the compressor for cooling thereof during operation. Each stage of vanes and blades is configured differently for maximizing energy extraction from the combustion gases as they flow downstream through the turbine during operation. Each vane and blade also includes different cooling configurations specifically tailored to different heat loads from the combustion gases as they flow downstream over the pressure and suction sides thereof.

The typical turbine blade includes an airfoil having a radially outer tip spaced closely adjacent to a surrounding turbine shroud forming a small clearance or gap therebetween. During operation, the combustion gases flow over the pressure and suction sides of the turbine blade, and a small portion of the combustion gases leaks past the blade tip through the small tip clearance.

The blade tip is particularly difficult to cool since it is exposed to the hot combustion gases on both the pressure and suction sides of the airfoil between the leading and trailing edges, as well as over the tip itself in the tip-shroud gap.

Since blade tips are subject to occasional tip rubs with the surrounding turbine shroud, the tips typically include short height squealer rib extensions of the pressure and suction sidewalls extending radially outwardly from a tip floor that defines an outwardly open tip cavity. The tip floor defines the outer boundary for the internal cooling circuits of the airfoil, and positions the squealer ribs externally thereof which further increases the difficulty of tip cooling during operation.

Accordingly, turbine blade tips are subject to oxidation over extended use in the engine, and may require corresponding repair during maintenance outages of the engine. Oxidation damage to the blade tip commonly limits the useful life of the blade during operation, as well as decreases turbine efficiency as the blade tips oxidize and wear during operation and correspondingly increase the blade tip clearance.

Two significant improvements in blade tip cooling are found in U.S. Pat. Nos. 5,261,789 and 6,672,829, both assigned to the present assignee. In the earlier patent, a tip shelf is introduced along the pressure side of the turbine blade to offset inwardly the pressure side squealer rib for enhancing tip cooling by shielding the tip with a cooling air film for protection against the radial migration of combustion gases over the tip during operation.

The later patent discloses an inclined pressure side squealer rib at the tip shelf for protecting the cooling air film created thereat for enhancing tip performance.

However, since the blade tips are subject to occasional tip rubbing with the surrounding turbine shroud, the squealer ribs are subject to abrasion wear which affects both efficiency of blade tip performance, and effectiveness of the tip shelf cooling.

Accordingly, it is desired to provide a turbine blade with enhanced tip cooling notwithstanding tip rubs.

BRIEF DESCRIPTION OF THE INVENTION

A turbine airfoil includes opposite pressure and suction sidewalls, and extends in chord between opposite leading and trailing edges and in span from a root to an outer tip cap. The tip cap bridges the sidewalls, and a flute extends chordally along the pressure sidewall and below the tip cap.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
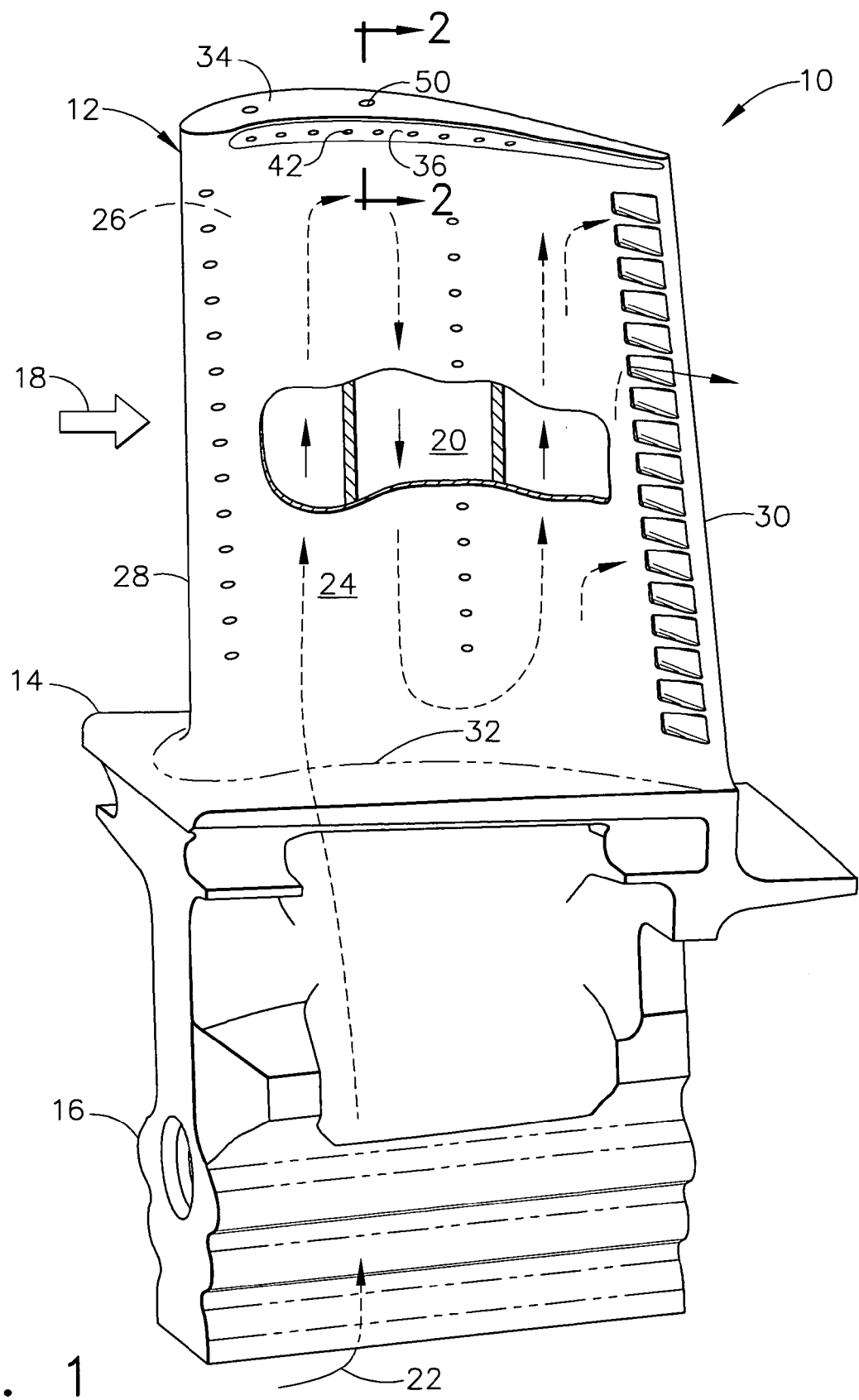
FIG. 1 is an elevational isometric view of a turbine rotor blade in an exemplary configuration.

Illustrated in FIG. 1 is a turbine rotor blade 10 for a gas turbine engine. The blade includes a hollow airfoil 12 integrally joined in turn to a radially inner platform 14 and dovetail 16. The exemplary dovetail is an axial entry dovetail with multiple tangs or lobes supported in a complementary dovetail slot in the perimeter of a rotor disk (not shown).

A full row of the turbine blades 10 extends radially outwardly from the supporting rotor disk and receives combustion gases 18 from an upstream combustor (not shown) for extracting energy therefrom to power the engine compressor (not shown) during operation.

The hollow airfoil includes an internal cooling circuit 20 therein which receives cooling air 22 bled from the compressor during operation through an inlet channel in the dovetail. The cooling circuit may have any conventional configuration, such as the three-pass serpentine cooling circuit illustrated, with suitable inlet and outlet holes. The circuit typically discharges the spent cooling air through various rows of film cooling holes through the airfoil, and through a row of trailing edge outlet holes.

The airfoil 12 includes a generally concave pressure sidewall 24, and a laterally or circumferentially opposite, generally convex suction sidewall 26 extending chordally or axially in chord between opposite leading and trailing edges 28,30, and in longitudinal or radial span from a root 32 at the platform 14 to a radially outer blunt tip cap 34 at the distal end of the airfoil.

Figure 2:
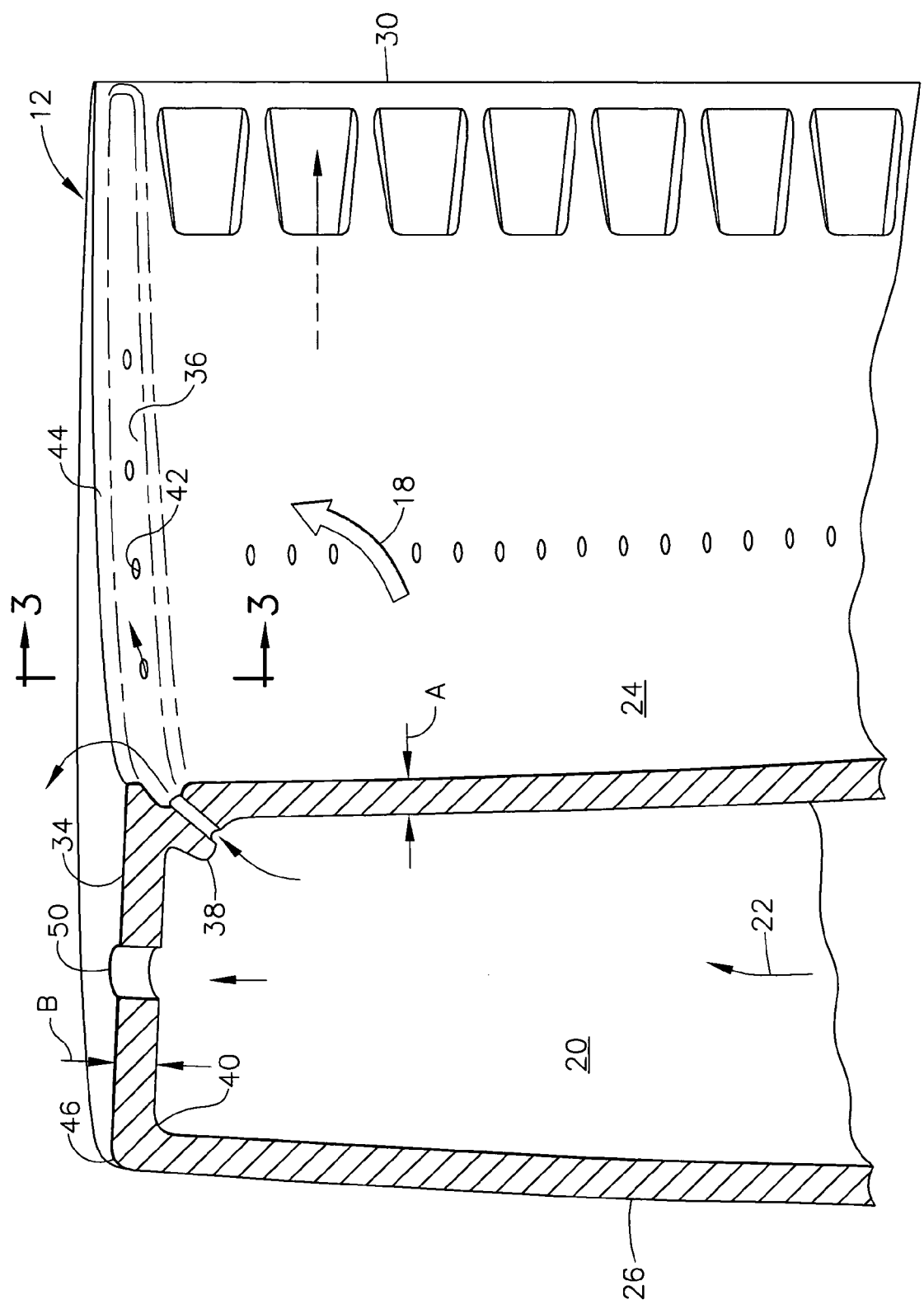
FIG. 2 is a partly sectional, isometric view of a portion of the blade tip illustrated in FIG. 1, and taken generally along line 2-2.
Figure 3:
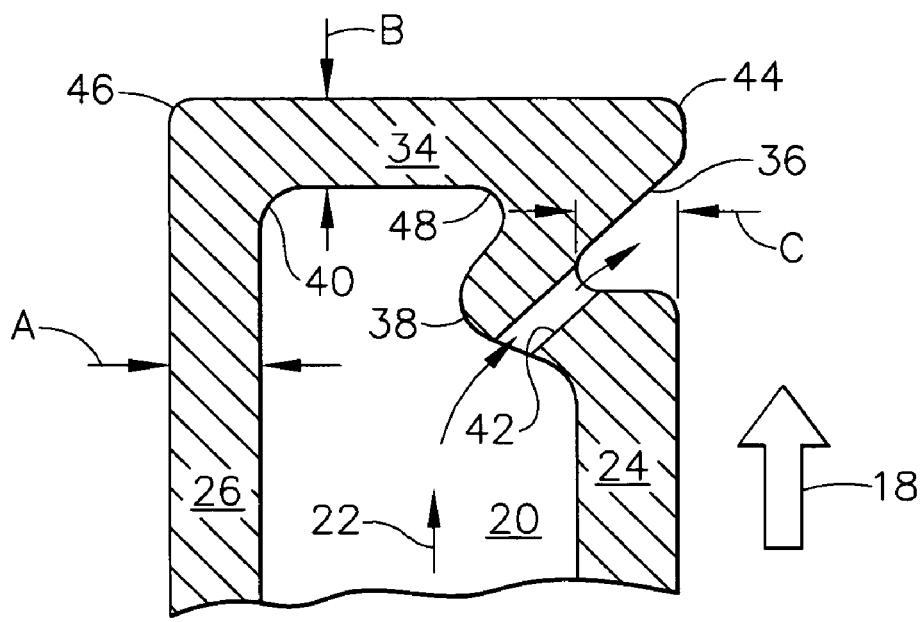
FIG. 3 is an enlarged, partly sectional view of the blade tip illustrated in FIG. 2, and taken along line 3-3.

The tip cap 34 illustrated in FIGS. 2 and 3 provides a blunt or generally flat distal end of the airfoil and is devoid of the typical squealer ribs or short extensions of the two sidewalls which commonly form an exposed tip cavity in the airfoil.

By eliminating the conventional squealer ribs, the additional complexity of cooling those ribs is also eliminated.

Instead, the tip cap 34 itself is internally cooled by the cooling air 22 circulated in the internal cooling circuit 20. And, a pressure side first flute 36 is introduced just below the tip cap for both cooling the tip cap during operation and improving the sealing performance of the tip cap when mounted inside the conventional turbine shroud (not shown) disposed therearound with a small clearance or gap radially therebetween.

The flute 36 as illustrated in FIGS. 1-3 extends axially or chordally in the external surface of the pressure sidewall 24, and is closely spaced in span radially below the tip cap itself. The tip flute 36 commences in the pressure sidewall 24 directly behind the leading edge 28 as shown in FIG. 1, and extends chordally in the aft direction toward the trailing edge 30, in most part below the tip cap 34 itself. The opposite two ends of the flute 36 suitably blend in depth in the airfoil near the leading and trailing edges where they terminate.

As shown in FIG. 3, the pressure sidewall 24 joins the tip cap 34 at an internal, convex bulge or bend 38 which backs or contains a portion of the external flute 36. Correspondingly, the suction sidewall 26 joins the tip cap 34 at an internal, concave first fillet 40 having a suitable radius for smoothly blending together the suction sidewall and tip cap.

Both the internal bend 38 and fillet 40 are disposed in radial span below the inner surface of the tip cap 34 for maintaining the full thickness of the tip cap over the internal cooling circuit 20 and between the opposite sidewalls.

A row of conventional film cooling holes 42 extends in flow communication from the internal cooling circuit 20 through the internal bend 38 and into the flute 36 for discharging cooling air therein during operation. The flute 36 fills with the pressurized cooling air during operation and provides a thermally insulating air layer that protects the tip cap from the hot combustion gases 18 which flow thereover during operation.

Since the airfoil rotates with the suction side leading the pressure side, the combustion gases flow over the tip cap first from the pressure side where they meet the cooling air discharged from the pressure side flute 36. The cooling air discharged from the flute continues to flow in the predominant direction over the tip cap from the pressure side to the suction side and protects the tip cap from the combustion gases.

The spent cooling air channeled into the gap between the tip cap and surrounding turbine shroud also improves the sealing performance of the airfoil at that gap by aerodynamically restraining the free flow of the combustion gases through the gap.

The tip cap 34 illustrated in FIGS. 2 and 3 is relatively simple and plain and includes a first squared external corner 44 adjoining the pressure sidewall 24 directly above the tip flute 36. The tip cap also includes a second external squared corner 46 adjoining the suction sidewall 26. The internal bend 38 is disposed directly behind and integral with the external first corner 44. And, the internal fillet 40 is disposed directly behind the external second corner 46.

In this way, the first corner 44 may be aligned coplanar with the external surface of the pressure sidewall 24 below the flute 36 for continuing that pressure sidewall, and maximizing the available surface area for extracting energy from the combustion gases. Similarly, the second corner 46 is aligned coplanar with the external surface of the suction sidewall 26 for maximizing the surface area of that sidewall and the energy extracted from the combustion gases during operation.

As indicated above, the airfoil 12 is a hollow component containing the internal cooling circuit 20 therein through which the cooling air 22 is circulated for cooling the entire airfoil during operation from the heat loads of the external combustion gases. The two sidewalls 24,26 are relatively thin and lightweight and have a nominal thickness A near or where they join the tip cap 34 as shown in FIGS. 2 and 3. The tip cap 34 has a nominal thickness B which is relatively thin and similar or generally equal to the thickness A of the sidewalls close to the tip cap.

The film cooling holes 42 extend through the internal bend 38 and provide internal convection cooling thereof, and also remove heat from the first corner 44 that overhangs the flute 36 through the conduction path provided by the bend itself.

The tip flute 36 illustrated in FIG. 3 extends in lateral depth C into the pressure sidewall 24 preferably greater than the sidewall thickness A to reach the internal bend 38 and extend in small part into that bend 38.

The internal bend 38 preferably joins the inner surface of the tip cap 34 at a second concave fillet or groove 48 which is preferably recessed behind the bend 38 for minimizing the thickness between the tip cap and bend behind the flute. The internal bend 38 also joins the inner surface of the pressure sidewall 24 below the flute 36 at another arcuate fillet.

The several internal arcuate fillets formed under the tip cap and around the internal bend 38 locally increase the surface area available for convection cooling of the pressure and suction sidewalls and their junctions with the common tip cap 34 extending therebetween. The internal bend 38 conforms with the configuration of the tip flute 36, and the corresponding fillets blend the bend into the tip cap and pressure sidewall for reducing stresses during operation while providing a narrow heat conduction path around the tip flute 36 for cooling the airfoil tip.

In a preferred embodiment of the airfoil tip illustrated in FIG. 3, the tip flute 36 is generally concentric in transverse profile with the internal bend 38, with the internal bend 38 providing a narrow band of metal backing the flute 36.

The flute 36 has a concave center fillet which reaches into the bend 38 and complements the convex configuration thereof. The center fillet of the flute blends laterally outwardly in corresponding outer and inner convex radii with the pressure side corner 44 atop the flute and the external surface of the pressure sidewall 24 below the flute.

The flute also includes a lower or base wall that bridges the top of the pressure sidewall 24 in horizontal elevation, and an upper wall which is inclined at about 45 degrees outwardly from the flute inner wall.

The flute 36 therefore diverges outwardly from the row of film cooling holes 42, and diffuses the spent cooling air discharged through holes 42 prior to forming the film cooling layer discharged from the flute itself.

The inclination angle of the flute outer wall will correspondingly vary along with the flute depth C from the midspan of the flute between its opposite ends that blend near the leading and trailing edges of the airfoil when the depth C of the flute reaches zero.

The tip cap 34 illustrated in FIG. 2 is preferably imperforate and devoid of holes or discontinuities as found in the original tip cavity formed by squealer ribs, except for one or more relatively large dust holes 50. The dust holes 50 are provided at the radially outer turns of the internal cooling circuit 20 as required for discharging any dust contained in the cooling air, without clogging the dust holes 50 during operation.

The dust holes are therefore typically larger in diameter than typical film cooling holes or other types of tip cooling holes, which are correspondingly small in diameter for preventing excess discharge of cooling air from the cooling circuit. The tip holes 50 are preferably disposed laterally between the first and second corners 44,46 near the middle of the tip cap. Furthermore, the tip holes 50 promote circulation of the internal cooling air 22 along the internal fillets and bend 38 below the tip cap for improving internal cooling of the tip cap itself.

As shown in FIG. 3, the tip cap 34 is preferably even or flat circumferentially between the first and second corners 44,46 without interruption, and without the previously used squealer ribs. This flat profile of the tip cap extends from the pressure side to the suction side in the direction of blade rotation, and may have a slight convex curvature in the circumferential rotary direction that is imperceptible to the untrained eye for matching the concave curvature of the surrounding turbine shroud in the high pressure turbine of the gas turbine engine.

Figure 4:
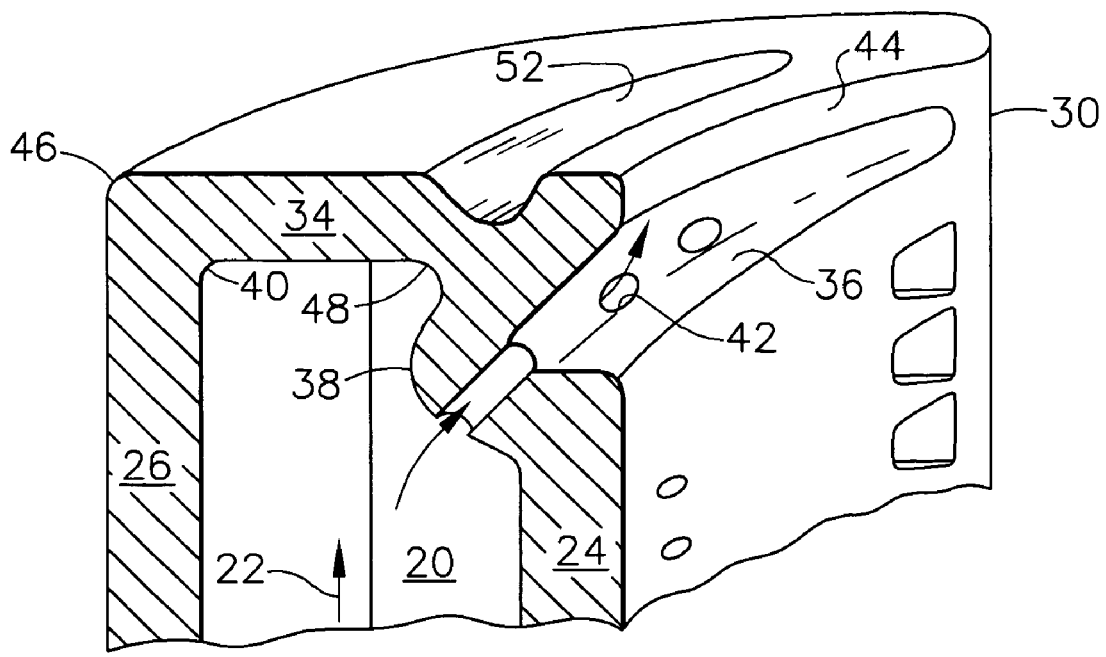
FIG. 4 is an enlarged, partly sectional view of an alternate embodiment of the blade tip.

FIG. 4 illustrates another embodiment of the tip cap 34 that yet again is substantially flat between the two corners 44,46 except for the introduction of a second flute or tip groove 52. The tip groove 52 is spaced inboard from the first corner 44 and the tip flute 36 disposed therebelow, and is aligned atop the internal bend 38.

The tip groove 52 diverges outwardly from its center fillet, and like the flute 36, blends in depth near both the leading and trailing edges of the airfoil, where its radial depth reduces to zero. The tip cap is preferably imperforate along the tip groove 52, with the tip groove 52 providing a recirculation zone atop the airfoil in which the combustion gases and spent cooling air from the tip flute 36 may recirculate for improving sealing performance of the airfoil tip with the surrounding turbine shroud.

Furthermore, the tip groove 52 reduces the thermal mass of the tip cap between the first corner 44, the internal bend 38, and the tip flute 36 for reducing the operating temperature of the airfoil tip in this region.

The turbine blade disclosed above in exemplary and preferred embodiments substitutes the blunt tip cap for the conventional blade tip having squealer ribs with an exposed tip cavity therebetween. The squealer ribs are eliminated, and thusly external surface area exposed to the hot combustion gases is correspondingly reduced.

The tip cap itself is relatively thin and conforms in thickness with the pressure and suction sidewalls bridged or capped thereby. The thin tip cap is internally cooled by the cooling air 22 circulated through the internal cooling circuit 20 of any suitable configuration. And, the tip flute 36 is introduced along the pressure side of the airfoil directly below the pressure side first corner 44 for enhancing aerodynamic performance of the turbine blade itself, as well as discharging a film of cooling air to protect the tip cap from its outer surface.

The internal bend 38 preferably conforms in thickness with the pressure and suction sidewalls of the airfoil and adjoining tip cap for minimizing mass subject to centrifugal loads, minimizing mass subject to thermal heating, and improving cooling of the tip cap by the introduction of the film cooling holes 42 extending through the bend 38 which holes feed the tip flute 36 that extends axially along the bend 38.

As best illustrated in FIG. 3, the flute 36 is preferably disposed below the exposed top of the tip cap to maintain the generally square cross section of the first corner 44. In this way, the first corner 44 maintains a squared distal end of suitable radial height, with a corresponding flat external surface that is coplanar with the flat external surface of the pressure sidewall 24 below the flute.

The height of the first corner 44 may be about 5-10 mils which represents a minor portion of the full depth C of the flute, which is about 20-40 mils. In this way, the blunt tip cap and its squared corners are available for occasional tip rubbing with the surrounding turbine shroud and enjoy enhanced strength without compromising the configuration of the airfoil tip or its performance following tip rubbing.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

The invention claimed is:

1. A turbine airfoil comprising:
laterally opposite pressure and suction sidewalls extending in chord between opposite leading and trailing edges and in span from a root to an outer tip cap bridging said sidewalls at distal ends thereof;
a concave flute extending chordally in the external surface of said pressure sidewall and below said tip cap; and
said pressure sidewall joins said tip cap at an internal convex bend conformably backing said concave flute, and said suction sidewall joins said tip cap at an internal fillet, and both said bend and fillet are disposed below said tip cap.

2. An airfoil according to claim 1 wherein said airfoil further comprises an internal cooling circuit, and a row of film cooling holes extending therefrom and through said bend into said flute.

3. An airfoil according to claim 2 wherein said tip cap includes a first external corner adjoining said pressure sidewall above said flute, and a second external corner adjoining said suction sidewall, and said bend is disposed behind said first corner, and said fillet is disposed behind said second corner.

4. A turbine airfoil comprising:
laterally opposite pressure and suction sidewalls extending in chord between opposite leading and trailing edges and in span from a root to an outer tip cap bridging said sidewalls at distal ends thereof and bounding an internal cooling circuit;
a flute extending chordally in the external surface of said pressure sidewall and below said tip cap;
said pressure sidewall joins said tip cap at an internal bend backing said flute, and said suction sidewall joins said tip cap at an internal fillet, and both said bend and fillet are disposed below said tip cap;
a row of film cooling holes extending from said cooling circuit and through said bend into said flute; and
said tip cap includes a first external corner adjoining said pressure sidewall above said flute and said first corner is aligned coplanar with said external surface of said pressure sidewall below said flute, and a second external corner adjoining said suction sidewall, and said bend is disposed behind said first corner, and said fillet is disposed behind said second corner.

5. An airfoil according to claim 4 wherein said sidewalls have a nominal thickness near said tip cap, and said tip cap has a similar nominal thickness.

6. An airfoil according to claim 5 wherein said flute extends in depth into said pressure sidewall greater than said sidewall nominal thickness to extend in part into said bend.

7. An airfoil according to claim 5 wherein said bend joins said tip cap at a fillet recessed behind said bend.

8. An airfoil according to claim 5 wherein said flute is concentric with said bend, and commences in said pressure sidewall behind said leading edge and extends chordally toward said trailing edge below said tip cap.

9. An airfoil according to claim 5 wherein said tip cap is flat between said first and second corners.

10. An airfoil according to claim 5 wherein said tip cap includes a tip groove spaced inboard from said first corner and aligned atop said bend.

11. A turbine blade comprising:
a hollow airfoil integrally joined at a root to a platform and dovetail;
said airfoil including laterally opposite pressure and suction sidewalls and extending in chord between opposite leading and trailing edges and in span from said root to an outer blunt tip cap bridging said sidewalls at squared external corners therewith; and
a flute extending chordally in the external surface of said pressure sidewall and spaced below said corner thereat.

12. A blade according to claim 11 wherein said flute commences in said pressure sidewall behind said leading edge and extends chordally toward said trailing edge below said tip cap.

13. A turbine blade comprising:
a hollow airfoil integrally joined at a root to a platform and dovetail;
said airfoil including laterally opposite pressure and suction sidewalls and extending in chord between opposite leading and trailing edges and in span from said root to an outer tip cap bridging said sidewalls at distal ends thereof;
a flute commencing in said pressure sidewall behind said leading edge and extending chordally in the external surface of said pressure sidewall toward said trailing edge and below said tip cap; and
said pressure sidewall joins said tip cap at an internal bend concentrically backing said flute, and said suction sidewall joins said tip cap at an internal fillet, and both said bend and fillet are disposed below said tip cap.

14. A blade according to claim 13 wherein said airfoil further comprises an internal cooling circuit, and a row of film cooling holes extending therefrom and through said bend into said flute.

15. A blade according to claim 14 wherein said flute extends into said pressure sidewall to reach said bend.

16. A blade according to claim 14 wherein said bend joins said tip cap at a fillet recessed behind said bend.

17. A blade according to claim 14 wherein said tip cap includes a first external corner adjoining said pressure sidewall above said flute, and a second external corner adjoining said suction sidewall, and said bend is disposed behind said first corner, and said fillet is disposed behind said second corner.

18. A blade according to claim 17 wherein said tip cap is flat between said first and second corners.

19. A blade according to claim 17 wherein said tip cap includes a tip groove spaced inboard from said first corner and aligned atop said bend.

20. A blade according to claim 14 wherein said sidewalls have a nominal thickness near said tip cap, and said tip cap has a similar nominal thickness.

21. A blade according to claim 20 wherein said flute extends in depth into said pressure sidewall greater than said sidewall nominal thickness to extend in part into said bend.

22. A blade according to claim 14 wherein said first corner is aligned coplanar with said external surface of said pressure sidewall below said flute.

23. A blade according to claim 14 wherein said flute comprises a concave center fillet blending laterally with outer and inner convex radii.

24. A blade according to claim 14 wherein said bend is convex inside said cooling circuit.

25. A blade according to claim 14 wherein said airfoil further comprises a plurality of tip holes extending through said tip cap laterally between said first and second corners.

* * * * *